United States Patent [19]

Flood et al.

[11] Patent Number: 5,719,238
[45] Date of Patent: Feb. 17, 1998

[54] POLYKETONE POLYMER BLEND

[75] Inventors: John Edmond Flood; John Wilbur Kelley, both of Houston, Tex.

[73] Assignee: Shell Oil Company, Houston, Tex.

[21] Appl. No.: 499,154

[22] Filed: Jul. 7, 1995

[51] Int. Cl.$^6$ ...................................... C08L 77/00
[52] U.S. Cl. .................. 525/426; 525/178; 525/184; 525/421; 524/269; 524/538
[58] Field of Search .................... 525/420, 421, 525/419, 178, 184, 426

[56] References Cited

U.S. PATENT DOCUMENTS

| | | | |
|---|---|---|---|
| H988 | 11/1991 | Gergen et al. | 525/179 |
| 4,702,876 | 10/1987 | Ebregt et al. | 264/184 |
| 4,725,392 | 2/1988 | Matsui et al. | 264/85 |
| 4,839,437 | 6/1989 | Gergen et al. | 525/426 |
| 4,960,838 | 10/1990 | Gergen et al. | 525/426 |
| 4,963,627 | 10/1990 | Smyser et al. | 525/420 |
| 5,039,743 | 8/1991 | Machado | 525/92 |
| 5,071,925 | 12/1991 | Rostami | 525/434 |
| 5,270,113 | 12/1993 | Rebouillat et al. | 428/375 |
| 5,276,085 | 1/1994 | Kasowski et al. | 524/606 |
| 5,486,594 | 1/1996 | Gingrich et al. | 528/392 |

*Primary Examiner*—Mark L. Warzel
*Attorney, Agent, or Firm*—Todd F. Volyn

[57] ABSTRACT

A method of improving the tribological properties of a polyketone polymer are presented in which polyketone polymer starting materials are blended with an aramide. Blends produced according to this process are also presented. The blend is particularly useful in the manufacture of articles used in applications where surfaces are in contact during motion.

12 Claims, No Drawings

POLYKETONE POLYMER BLEND

FIELD OF THE INVENTION

This invention generally relates to polyketonepolymers. More particularly, the invention relates to a blend of polyketone polymers with improved tribological properties.

BACKGROUND OF THE INVENTION

Polymers of carbon monoxide and olefins, generally referred to as polyketones, are now well known. Perfectly alternating polymers of this type are disclosed in numerous patents assigned to Shell Oil Company which are exemplified by U.S. Pat. No. 4,880,865 and U.S. Pat. No. 4,818,811, each of which is herein incorporated by reference. Such polymers have utility as premium thermoplastics in the manufacture of a wide variety of applications.

The excellent mechanical properties of polyketones could be further exploited by blending them to produce materials exhibiting greater limiting pressure velocities (hereafter LPVs) and other improved tribological properties. Such polyketone articles placed in rolling or sliding contact would be able to withstand considerable applications of force over extended durations. New or additional additives are sought to attain this result. This is particularly true if such agents improve compounding or other processing steps.

It is known that agents such as certain silicon oils and/or polytetrafluoroethylene (PTFE) can be used to improve the lubricity of certain polymers including polyketones. While addition of such materials can improve the overall lubricity of the blend, a uniform distribution of additive and consistent lubricity are difficult to attain.

Another class of additives that are sometimes blended with polymers other than polyketones are the aramide fibers (fibers of aromatic polyamides). They have generally been found to improve wear reduction. Unfortunately, it is difficult to blend and process such materials because the aramide fibers have extremely low bulk densities. Another difficulty encountered with aramide additives is their proclivity for water gain. This can cause the resulting material to swell and change dimensions.

The art could benefit from polyketone polymers exhibiting further improvements in tribological properties. Such improvements would be especially useful if processing was more easily conducted and if the blends could be formed without a reduction or loss in mechanical properties.

SUMMARY OF THE INVENTION

In one aspect of this invention a polyketone blend is presented comprising a major mount of polyketone polymer and a minor mount of an aramide powder.

In another aspect of this invention polyketone polymer blends are presented comprising major amounts of polyketone polymer and minor amounts of PTFE, silicon oil, and para-phenyleneterepthalamide powder (PPTA) as the aramide.

In another aspect of the invention, a method is presented for improving the tribological properties of a polyketone polymer or polymer blend comprising mixing a minor amount of powder aramide with the polyketone polymer.

The inventive blends exhibit improved tribological properties.

DETAILED DESCRIPTION

The following terms when used in this specification shall have the following meanings:

DCOF: During relative motion of two surfaces in contact the DCOF is the ratio of the resulting frictional force to the applied normal force while holding the relative surface velocity constant over time.

LPV: While holding the relative surface velocity constant between two specimens in contact and increasing the applied normal force in a stepwise manner in time, the LPV is the multiplicative product of the normal pressure and surface velocity at the step just prior to catastrophic material failure due to thermal softening.

Wear K Factor: As performed on a thrust washer test apparatus using ASTM D3702 and defined as:

$$K(\text{wear factor}) = \frac{W}{FVT}$$

Where:

W=volume wear ($in^3$)

F=normal force (lb)

V=relative surface velocity (ft/min)

T=testing time (hr)

Generally, the materials useful in the practice of this invention include a linear alternating polymer of carbon monoxide and at least one ethylenically unsaturated hydrocarbon (sometimes simply referred to as "polyketone" or "polyketone polymer") and aramide powders. PTFK suitable silicone oil, and other lubricants can also be blended with the polyketone polymer. Additionally, other common polymer additives can be used in the blends or methods of this invention. For instance, fillers, extenders, pigments, plasticizers, and other polymeric materials can be added to the compositions to improve or otherwise alter the properties of the composition. In general, the practice of the method this invention involves suitably contacting sufficient quantities of the useful material to form the inventive blend.

The polyketone polymers which are employed as the major component of the polymer blends of the invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from 10 units to 100 units incorporating a moiety of the second hydrocarbon. The polymer chain of the preferred polyketone polymers is therefore represented by the repeating formula

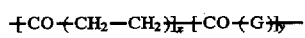

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(CH₂—CH₂)— units and the —CO—(G)— units are found randomly throughout the polymer chain, and preferred ratios of y:x are from about 0.01 to about 0.1. The precise nature of the end groups does not appear to influence the properties of the polymer to a considerable extent so the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer of a terpolymer, and in the case of terpolymers the nature of the proportion of the second hydrocarbon present Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

Preferred methods for the production of the polyketone polymers are illustrated by U.S. Pat. No. 4,808,699 and to van Broekhaven, et al which issued on Feb. 28, 1989 and Sep. 19, 1989 respectively and are incorporated herein by reference. U.S. Pat. No. 4,808,699 teaches the production of linear alternating polymers by contacting ethylene and carbon monoxide in the presence of a catalyst comprising a Group VIII metal compound, an anion of a nonhydrohalogenic acid with a pKa less than 6 and a bidentate phosphorous, arsenic or antimony ligand. U.S. Pat. No. 4,868,282 teaches the use of a similar catalyst in the production of linear random terpolymers by contacting carbon monoxide and ethylene in the presence of one or more hydrocarbons having an olefinically unsaturated group.

The aramides of this invention are polymers comprised of aromatic rings connected through carbamide bridges. These aramides have the following structure:

[—CO—NH—A₁—NH—CO—A₂—CO—]ₘ wherein $A_1$ and $A_2$ are the same or different substituted or unsubstituted aromatic, polyaromatic, or heteroaromatic rings. It is preferred that $A_1$ and $A_2$ are selected from the group consisting of 1,4-phenylene, 1,3-phenylene, 1,2-phenylene, 4,4'-biphenylene, 2,6-naphthylene, 1,5-naphthylene, 1,4-naphthylnene, phenoxyphenyl-1,4'-diylene, phenoxyphenyl-3,4'-diylene, 2,5-pyridylene and 2,6-quinolylene. Preferred substituents include $C_{1-4}$ alkyl, phenyl, carboalkyoxyl, $C_{1-4}$ alkoxyl, acyloxy, nitro, dialkylamino, thioalkyl, carboxyl, and sulfonyl groups. The CONH group may also be replaced by a carbonyl-hydrazide-CONHNH-, azo, or aoxy group.

Preferred aramides are polyphyleneisothalamide and polyphenyleneterephthalamide. Polyparaphenyleneterephtalamide (PPTA) is the most preferred aramide. Additional bridging groups to include $O, S, SO_2$, NR, $N_2$, $CR_2$, and CO may also be present in addition to the carbade bridges (here, R is H, or an alkyl group).

Such aramides are commonly used as fibers or filaments in polymer blends. The aramides of this invention are powders. Ideally, the powders have the smallest particle sizes obtainable. However, aramide powders having an average particle size of about 50 u and less are suitable to practice this invention. These aramide powders can be obtained commercially as "TWARON" brand aramide powder from Akzo N.V.

Fluorinated hydrocarbons (fluoropolymers) useful in this invention typically have a melting temperature at least 10°–20 degrees above 500° F. Examples of such fluoropolymers include perfluoroalkoxy resin (PFA), ethylene-tetrafluoroethylene (EIFE), fluorinated ethylene propylene (FEP) and polytetrafluoroethylene (FIFE). PTFE is preferred. The fluoropolymers are generally present in an amount of from about 1–20 wt %, and preferably from about 5–15 wt % based on total blend composition.

The useful silicone oils can be described as linear chains of polydimethyl siloxane with viscosities ranging from about 1,000–300,000 centistokes. The preferred silicone oils are linear chains of polydimethyl siloxane with viscosities between about 10,000 and 100,000 centistokes. The most preferred silicone oil is 30,000 cs oil. Typically, silicone oil(s) are present in the blend in an amount of from about 0.1–5 wt %, and preferably from about 0.5–2 wt %.

The method of producing the inventive polymer blend is not material so long as a relatively uniform distribution of the components is obtained. generally speaking, any conventional or known method for producing blends is considered suitable. In one embodiment, aramide powder is dry blended with polyketone pellets and metered into a twin screw or single screw extruder. In another embodiment, aramide powder and fluoropolymer powder is dry blended with silicone oil and metered upstream along with polyketone pellets into a twin screw extruder/single screw extruder. The aramide/fluoropolymer powder/silicone oil blend can also be metered down-stream into a twin screw extruder while the polyketone polymer is metered upstream. A dry blend of aramide powder, polyketone pellets or powder, fluoropolymer powder and silicone oil can also be metered up-stream into a twin or single screw extruder.

When polyketone polymer and aramide powders are the primary constituents of the blend, between about 5 and 30% wt (based on total weight of blend) of aramide powder is blended with the polyketone. Preferably, between about 10 and 20% wt (same basis) are added. It is most preferred that the blend be comprised of about 10% wt aramide. In any event, it is desirable to have no more than between about 10 and 50% wt of the blend comprised of a combination of aramide, fluoropolymer, and silicone oil. Thus, fluoropolymer and silicone additives are desirably present in quantities sufficient such that they comprises between about 5.0 and 30.0 and 0.5 and 4.0% wt of the blend respectively. The inventive blend can be processed by conventional methods such as extrusion and injection molding into various articles of manufacture which are particularly useful in applications requiring good tribological properties. Examples of such applications include gears, cams, guides, levers, ratchets, seals, belt chains, plane and roller bearings, linear bearings, sleeve bearings, pulleys, and sliding plates.

The invention is further illustrated by the following non-limiting examples.

EXAMPLES

In each of examples 1–8, cryoground polyketone powder was blended with the additives in a Henschel blender and extruded in a Berstorff twin screw extruder. In each case the material blended easily into a uniform blend of polymer and additive.

Tribological testing was accomplished with the use of a Computer Controlled Multi-Specimen Test Machine manufactured by Falex Corporation. In this testing, a thrustwasher injection molded from the material to be tested was spun against a steel stationary washer in one direction. Data logging for the following parameters was conducted continuously: speed, load, temperature, wear, and run time. LPVs, DCOF, and Wear Factors were computed from this data logging.

DCOF was measured at 10 fpm velocity with stepped load increments (5 to 70 lbs. ). The 5 lb. step runs 30 minutes and each succeeding step runs 15 minutes to allow the temperature to reach a steady state. LPV was measured at 100 fpm velocity with stepped 10 lb. load increments from 20 lbs. to specimen failure. Specimen failure is the sudden loss of structural integrity at melt softening. Wear tests were run at 8 lbs. load and 50 fpm velocity for 40 hours to seat the test specimen. The specimen was then run at the same conditions for about 212 hours on a new stationary washer. The test specimen and stationary washer were measured for thickness and weight before and after each run. The specific gravity of the test specimen was then incorporated into the computation of the resulting wear factor.

Example 1

Neat linear poly ketone (terpolymer of carbon monoxide, ethylene, and a minor amount of propylene) having a melting point of about 220° C. and a limiting viscosity number of about 1.8 dL/g was prepared. Mechanical and tribological properties are listed in Table 1.

Examples 2 and 3

Blends of polyketone (as described in Example 1) and PPTA powder (para-phenyleneterepthalamide commercially available from Akzo N. V.) were prepared. The blend was easily processed and presented no difficulty during the injection molding of tensile bars. Mechanical and tibological properties are listed in Table 1.

These examples show the substantial improvement in limiting PV's and wear factors in the polyketone-aramide blend relative to neat polyketone. While the introduction of particulate matter reduced toughness (Izod strength) somewhat, the elongation at yield was almost equal to the neat polymer. This demonstrates that tribological property improvement is attained without considerable loss of mechanical properties.

Example 4

A blend of polyketone, PPTA powder (as described above), and dimethyl siloxane silicone oil having a viscosity of about 30, 000 centistokes (commercially available from Dow Chemical Co. as "DOW 200") was prepared. The blend was easily processed and presented no difficulty during injection molding of tensile bars. Mechanical and tribological properties are listed in Table 1.

This example shows the improvement in tribological properties using an aramide in combination with a potential lubricant.

Example 5 (Comparative)

A blend of polyketone, PTFE powder (commercially available as "WITCON TL-6" from ICI, Inc. ), and the silicone oil of example 4 was prepared. The DCOF and wear factor is lower and the limiting PV is higher than the neat polymer of example 1. This blend thus displayed improved tribological properties relative to the neat polymer.

Example 6

The blend of example 5 was prepared with the addition of the PFTA powder described in example 2. The blend was easily processed and presented no difficulty during injection molding of tensile bars. The DCOF was lower, the wear number was lower, and the limiting PV is significantly higher than the blend of Example 5. This example illustrates that the introduction of aramides further enhances the improvement of tribological properties attained in other tribological blends of polyketone.

Example 7 (Comparative)

A blend of polyketone described in example 2, fiberglass commercially available as "408 BC" from Owens Corning, Inc., FFFE, and silicone oil (as described in example 5) was prepared. Compared to the neat polymer there was a significant increase in the wear factor but there was a decrease in the DCOF. The Limiting PV was slightly higher relative to example 1.

Example 8

The blend of example 7 was prepared with the addition of PPTA powder. The blend was easily processed and presented no difficulty during injection molding of tensile bars. A lower wear number and significantly higher limiting PV were attained relative to example 7. Again, the introduction of aramide powder resulted in an overall improvement in the tribological properties relative to other tribological grades of polyketone.

Example 9 (Comparative)

The neat polyketone polymer of example 1 was blended with aramide fibers commercially available as "TWARON" from Akzo, N.V. The mixture did not blend uniformly and was extremely difficult to process. The low bulk density of the aramide fibers made it possible to blend only about 2wt % into the blend.

TABLE 1

| | Unless specifically stated tensile strengths are at yield and elongations are yield. | | | | | | | | | |
|---|---|---|---|---|---|---|---|---|---|---|
| Examples | Aramide (wt %) | PTFE (wt %) | Si oil (wt %) | FG (wt %) | Wear Factor $10^{-10}$ in$^3$-min/lb-ft-hr | LPV (fpm × lb force) | DCOF | Notched Izod (ft-lb) | Tensile Strength (psi) | Elongation (%) |
| 1 | — | — | — | — | 215 | 32000 | 0.49 | 4 | 9000 | 21 |
| 2 | 5 | — | — | — | — | 43300 | 0.66 | 1.5 | 8500 | 20 |
| 3 | 10 | — | — | — | 32 | 40000 | 0.48 | 2.0 | 6700 | 18 |
| 4 | 10 | — | 2 | — | 56 | 50000 | 0.25 | 2.1 | 7000 | 19 |

TABLE 1-continued

| | | | | | Wear Factor | LPV | | Notched | Tensile | |
| Examples | Aramide (wt %) | PTFE (wt %) | Si oil (wt %) | FG (wt %) | $10^{-10}$ in$^3$- min/lb-ft-hr | (fpm × lb force) | DCOF | Izod (ft-lb) | Strength (psi) | Elongation (%) |
|---|---|---|---|---|---|---|---|---|---|---|
| 5 | — | 10 | 2 | — | 66 | 43000 | 0.21 | 5 | 7600 | 26 |
| 6 | 10 | 10 | 2 | — | 50 | 53000 | 0.17 | 2.1 | 6700 | 22 |
| 7 | — | 10 | 2 | 15 | 670 | 37000 | 0.23 | 1.8 | 13300* | 4.7* |
| 8 | 10 | 10 | 2 | 15 | 390 | 48000 | 0.28 | 2 | 11700* | 4.8* |

Si oil = silicone oil
FG = fiberglass
LPV = Limiting pressure times velocity (lb/in$^2$ × ft/min) @ 100 ft/min
DCOF = dynamic coefficient of friction
Units for wear factor = (@ PV = 2000
*At break

What is claimed is:

1. A process for improving the tribological properties of a linear alternating polyketone polymer comprising: blending an aramide powder with polyketone polymer wherein said aramide powder has the structure:

[—CO—NH—A$_1$—NH—CO—A$_2$—CO—]$_n$ wherein A$_1$ and A$_2$ are each a substituted or unsubstituted paraphenylene group, provided that where A$_1$ or A$_2$ are substituted, the substituents thereon are independently selected from the group consisting of C$_{1-4}$ alkyl, phenyl, carboalkyoxyl, C$_{1-4}$ alkoxyl, acyloxy, nitro, dialkylamino, thioalkyl, carboxyl, and sulfonyl groups and wherein the polyketone polymer is a linear alternating polymer of carbon monozide and at least one ethylenically unsaturated hydrocarbon.

2. The process of claim 1 wherein said aramide powder comprises between about 5 and 30 wt % (based on total weight of blend).

3. The process of claim 1 wherein said aramide is a polyphenyleneterphthalamide.

4. The process of claim 3 wherein said aramide is para-polyphenyleneterephtalamide.

5. The process of claim I further comprising the step of blending a fluoropolymer therein.

6. The process of claim 1 further comprising the step of blending a silicone oil therein.

7. The process of claim 1 wherein the limiting pressure velocity of the blend produced therein is at least 25% greater than polyketone polymer starting material.

8. The process of claim 1 wherein the wear factor of the blend produced therein is reduced to an amount no greater than 22% of the wear factor of the polyketone polymer starting material.

9. A blend produced according to the process of claim 1.

10. A polyketone blend comprising a major amount of linear alternating polymer of carbon monoxide and an ethylenically unsaturated hydrocarbon and aramide powder having the structure:

[—CO—NH—A$_1$—NH—CO—A$_2$—CO—]$_n$ wherein A$_1$ and A$_2$ are each a substituted or unsubstituted paraphenylene group, provided that where A$_1$ or A$_2$ are substituted, the substituents thereon are independently selected from the group consisting of C$_{1-4}$ alkyl, phenyl, carboalkyoxyl, C$_{1-4}$ alkoxyl, acyloxy, vitro, dialkylamino, thioalkyl, carboxyl, and sulfonyl groups.

11. A blend as in claim 10 wherein said aramide comprises between about 10 and 20 wt % of said polymer blend.

12. An article of manufacture made from the blend of claim 10.

* * * * *